United States Patent
Udagawa et al.

(10) Patent No.: US 10,981,307 B2
(45) Date of Patent: Apr. 20, 2021

(54) MANUFACTURING METHOD OF MOLDED PRODUCT, MOLDED PRODUCT, CARTRIDGE, AND IMAGE FORMING APPARATUS

(71) Applicant: CANON KABUSHIKI KAISHA, Tokyo (JP)

(72) Inventors: Masaaki Udagawa, Tsukuba (JP); Yohei Doi, Yokohama (JP); Daigo Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 258 days.

(21) Appl. No.: 15/918,140

(22) Filed: Mar. 12, 2018

(65) Prior Publication Data
US 2018/0272582 A1 Sep. 27, 2018

(30) Foreign Application Priority Data

Mar. 21, 2017 (JP) .............................. JP2017-055124

(51) Int. Cl.
| | |
|---|---|
| *B29C 45/14* | (2006.01) |
| *B29C 45/26* | (2006.01) |
| *G03G 15/00* | (2006.01) |
| *G03G 21/18* | (2006.01) |
| *B29L 31/00* | (2006.01) |
| *B29K 705/00* | (2006.01) |

(52) U.S. Cl.
CPC .. *B29C 45/14065* (2013.01); *B29C 45/14336* (2013.01); *B29C 45/14827* (2013.01); *B29C 45/2606* (2013.01); *G03G 15/757* (2013.01); *G03G 21/181* (2013.01); *B29C 2045/14147* (2013.01); *B29K 2705/00* (2013.01); *B29L 2031/767* (2013.01); *G03G 21/1857* (2013.01)

(58) Field of Classification Search
None
See application file for complete search history.

(56) References Cited

U.S. PATENT DOCUMENTS

| | | | | |
|---|---|---|---|---|
| 3,861,845 A | * | 1/1975 | Butcher | B29C 49/4817 425/531 |
| 4,272,660 A | * | 6/1981 | Mayer | H01H 35/34 200/302.1 |
| 4,501,540 A | * | 2/1985 | Kako | B29C 45/14 249/93 |

FOREIGN PATENT DOCUMENTS

| | | |
|---|---|---|
| JP | 9-300393 A | 11/1997 |
| JP | 2007-015389 A | 1/2007 |

OTHER PUBLICATIONS

Kochi et al., U.S. Appl. No. 15/922,004, filed Mar. 15, 2018.
Notification of Reason for Refusal in Japanese Application No. 2017-055124 (Feb. 2021).

* cited by examiner

*Primary Examiner* — Monica A Huson
*Assistant Examiner* — Kelsey C Grace
(74) *Attorney, Agent, or Firm* — Venable LLP

(57) ABSTRACT

A method of producing a molded product includes preparing a mold for insert molding, setting an insert member, forming a cavity in a condition in which the insert member is disposed by closing the mold and injecting a molten resin into the cavity. The mold for insert molding includes first and second molds, and the first mold has a guide surface provided at a part corresponding to a trunk portion of the molded product within a wall surface defining a groove portion which constitutes a part of the cavity. The insert member is set at the groove portion of the first mold while the projecting portion being guided by the guide surface.

6 Claims, 16 Drawing Sheets

MANUFACTURING METHOD OF MOLDED PRODUCT, MOLDED PRODUCT, CARTRIDGE, AND IMAGE FORMING APPARATUS

BACKGROUND OF THE INVENTION

Field of the Invention

The present invention relates to insert molding.

Description of the Related Art

Hitherto, there is known insert molding of setting an insert member such as a metal member in a cavity within a mold for insert molding and of injecting a molten resin around the insert member to coat the insert member by the resin member in order to enhance rigidity and creep strength of a molded product.

The insert member is often formed into a complicated shape by bending or the like following a shape of the molded product. The insert member of this sort is plastically deformed by pressing or the like and has process variations in terms of a bending angle. In order to steadily set the insert member having the process variations into a mold, an expensive robot having an accurate positioning function or manpower is required, thus lowering profitability and productivity. In order to deal with this problem, Japanese Patent Application Laid-open No. 2007-15389 discloses a method of improving productivity by guiding a terminal to an insertion hole while pressing a stiffening plate to the terminal.

However, the method disclosed in Japanese Patent Application Laid-open No. 2007-15389 requires to incorporate the stiffening plate into an injection molding machine besides the mold in order to set the insert member having the process variations in the mold. This method requires a mechanism for driving the stiffening plate because the stiffening plate needs to be moved to a position where the stiffening plate is not sandwiched by the molds when the molds are closed and needs to be moved to a position adjacent a groove portion of the mold in setting the insert member to the groove portion of the mold. Accordingly, this method has a problem that the injection molding machine is enlarged and is complicated due to the stiffening plate.

SUMMARY OF THE INVENTION

According to a first aspect of the present invention, a method of producing a molded product includes preparing a mold for insert molding which comprises a plurality of molds including first and second molds and in which a cavity corresponding to the molded product having a trunk portion and an arm portion extending from the trunk portion is defined, the first mold having a guide surface provided at a part corresponding to the trunk portion within a wall surface defining a groove portion which constitutes a part of the cavity, setting an insert member, including a base portion and a projecting portion connected with the base portion, at the groove portion of the first mold while guiding the projecting portion by the guide surface, forming the cavity in a condition in which the insert member is disposed by closing the plurality of molds, and injecting a molten resin into the cavity.

According to a second aspect of the present invention, a molded product includes a trunk portion including a first metal portion and a first resin portion, and an arm portion extending from the trunk portion, the arm portion including a second metal portion extending from the first metal portion and a second resin portion. The first metal portion includes a base portion and a projecting portion extending from the base portion.

Further features of the present invention will become apparent from the following description of exemplary embodiments with reference to the attached drawings.

DESCRIPTION OF THE EMBODIMENTS

Embodiments for carrying out the present disclosure will be described in detail with reference to the drawings.

First Embodiment

Figure 1:
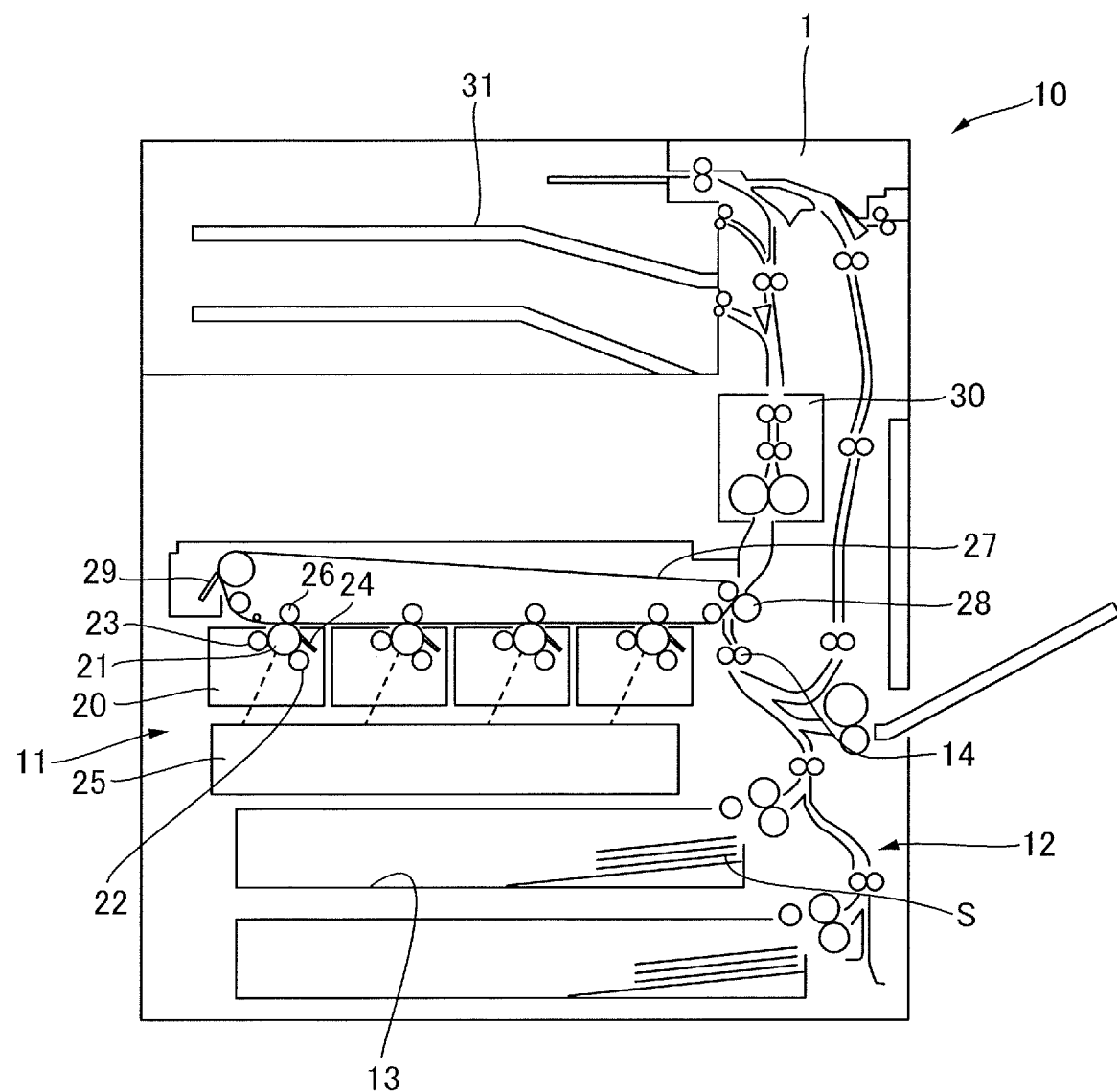
FIG. 1 is a schematic diagram illustrating a configuration of an image forming apparatus of a first embodiment.

FIG. 1 is a schematic diagram illustrating a configuration of an image forming apparatus of the first embodiment. The image forming apparatus 10 is an electro-photographic type full-color printer. The image forming apparatus 10 includes an image forming portion 11 and a conveyance portion 12 configured to convey a sheet S. The image forming portion 11 has a so-called tandem type configuration in which a plurality (four in the present embodiment) of cartridges 20 is arrayed in a traveling direction of an intermediate transfer belt 27. The respective cartridges are process cartridges for use in the image forming apparatus and form toner images of yellow, magenta, cyan and black, respectively.

The plurality of cartridges 20 are detachably mounted to a body 1 of the image forming apparatus. Here, because configurations of the respective cartridges 20 are same except of their toner colors, only the left end cartridge 20 in FIG. 1 will be described below, and reference numerals and description of the other cartridges will be omitted.

The cartridge 20 includes a photosensitive drum 21, an electrifying roller 22, a developing unit 23, and a drum cleaner 24. The photosensitive drum 21 is rotationally driven with a predetermined process speed by a drum motor not illustrated and disposed within the image forming apparatus body 1 of the image forming apparatus. A surface of the photosensitive drum 21 is homogeneously electrified by the electrifying roller 22. Then, a scanner unit 25 irradiates a laser beam based on image information on the electrified surface of the photosensitive drum 21 to form an electrostatic latent image. The electrostatic latent image on the photosensitive drum 21 is developed as a toner image by the toner supplied from the developing unit 23. The toner image on the photosensitive drum 21 is primarily transferred onto the intermediate transfer belt by a primary transfer bias applied between a primary transfer roller 26 and the photosensitive drum 21. Transfer residual toner left on the photosensitive drum 21 after the transfer is removed by the drum cleaner 24.

Such processes are executed in the respective cartridges 20 and the toner images of the respective colors formed on the photosensitive drums 21 of the respective cartridges 20 are superimposed and transferred onto the intermediate transfer belt 27 so as to form a full-color toner image on the intermediate transfer belt 27. The toner image formed on the intermediate transfer belt 27 is then secondarily transferred onto the sheet S being conveyed by the conveyance portion 12 to a secondary transfer portion composed of the intermediate transfer belt 27 and a secondary transfer roller 28. The toner left on the intermediate transfer belt 27 after the transfer is removed by a belt cleaner 29.

The conveyance portion 12 is composed of a plurality of conveyance rollers so as to pick up the sheet S stored in a cassette 13 and to convey to the secondary transfer portion of the image forming portion 11. The sheet S is conveyed to the secondary transfer portion in synchronism with the toner image on the intermediate transfer belt 27 by a registration roller pair 14. The sheet S onto which the toner image has been transferred at the secondary transfer portion is heated and pressurized by a fixing unit 30 to fix the toner image. The sheet S onto which the toner image has been fixed is discharged to a discharge tray 31.

Figure 2:
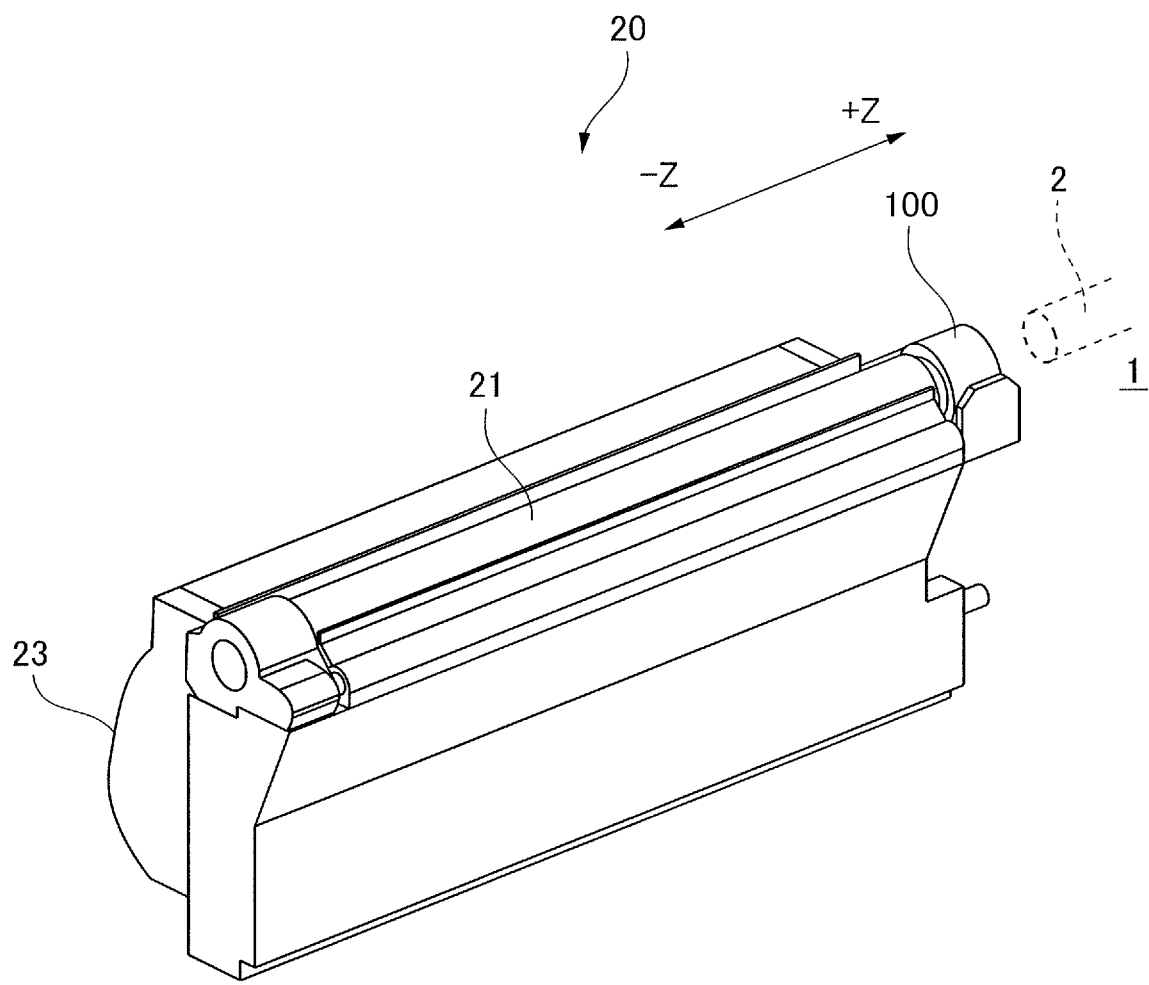
FIG. 2 is a perspective view of a cartridge mounted to a body of the image forming apparatus of the first embodiment.

FIG. 2 is a perspective view of the cartridge 20 mounted to the body 1 of the image forming apparatus of the first embodiment. The photosensitive drum 21 includes a cylindrical member made of aluminum for example and extending in a longitudinal direction (±Z direction) and a photosensitive layer formed on a surface of the cylindrical member. Attached at an end in the longitudinal direction of the photosensitive drum 21 is a transmission member 100 configured to transmit rotational force of a drum motor not illustrated of the image forming apparatus body 1. The transmission member 100 is configured so as to be engaged/disengaged with/from a driving shaft 2 of the image forming apparatus body 1 when a user of the image forming apparatus mounts/dismounts the cartridge 20 to/from the image forming apparatus body 1. For instance, in a case where the cartridge 20 is to be mounted to the image forming apparatus body 1, the user moves the cartridge 20 in the +Z direction while aligning axes of the transmission member 100 and the driving shaft 2 in FIG. 2 to engage the transmission member 100 with the driving shaft 2. In a case where the cartridge 20 is to be dismounted from the image forming apparatus body 1, the user moves the cartridge 20 in the −Z direction in FIG. 2 to disengage the transmission member 100 from the driving shaft 2.

Figure 3:
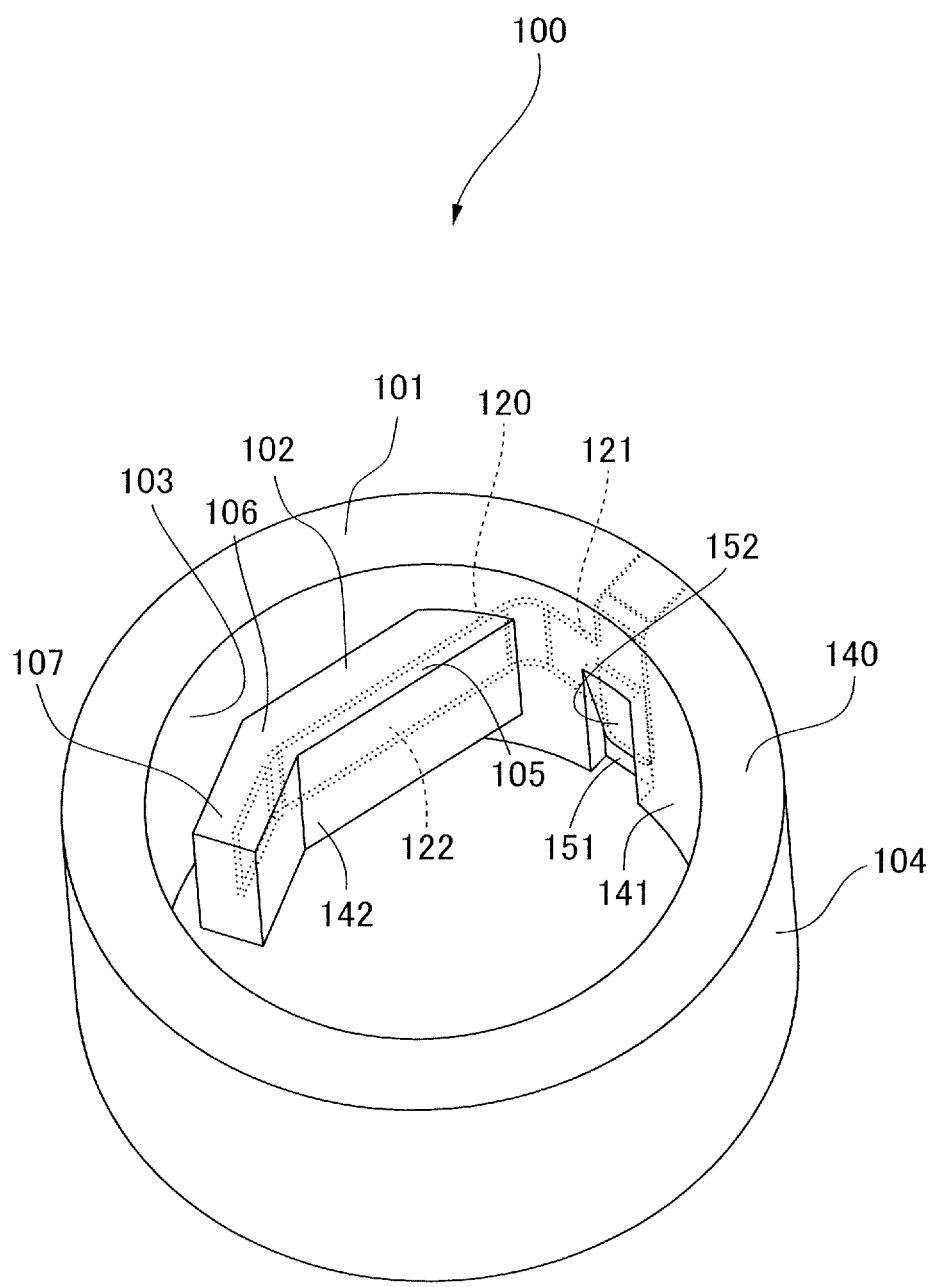
FIG. 3 is a perspective view illustrating a transmission member which is one exemplary molded product of the first embodiment.

FIG. 3 is a perspective view illustrating the transmission member 100 which is one exemplary molded product of the first embodiment. The transmission member 100 includes a cylindrical trunk portion 101 and an arm portion 102 extending from an inner circumferential surface 103 among the inner circumferential surface 103 and an outer circumferential surface 104 of the trunk portion 101. In a case where the cartridge 20 is mounted to the image forming apparatus body 1, the arm portion 102 of the transmission member 100 is engaged with a groove portion not illustrated of the driving shaft 2 of the image forming apparatus body 1. Still further, in a case where the cartridge 20 is to be dismounted from the image forming apparatus body 1, the arm portion 102 of the transmission member 100 is disengaged from the groove portion not illustrated of the driving shaft 2 of the image forming apparatus body 1. A thickness of the trunk portion 101 is around 1.5 mm for example. A thickness of the arm portion 102 is around 0.9 mm for example.

The transmission member 100 of the first embodiment is manufactured by way of insert molding. The transmission member 100 is a molded product composed of a metal member 120 which is one example of a reinforcing insert member configured to assure rigidity and creep strength of the arm portion 102 and a resin member 140 integrated with the metal member 120. The metal member 120 is formed by working, e.g., pressing, a metal plate such as stainless steel. The resin member 140 is a thermoplastic resin such as POM.

The metal member 120 includes a metal portion 121 which is a component of the trunk portion 101 and is a first metal portion and a metal portion 122 which is a second metal portion extending from the metal portion 121. The resin member 140 includes a resin portion 141 which is a component of the trunk portion 101 and a first resin portion integrated with the metal portion 121 and a resin portion 142 which is a component of the arm portion 102 and is a second resin portion integrated with the metal portion 122. Thus, the metal member 120 is disposed so as to extend over the trunk portion 101 and the arm portion 102. The metal portion 122 is formed into a shape following a shape of the arm portion 102.

Figure 4:
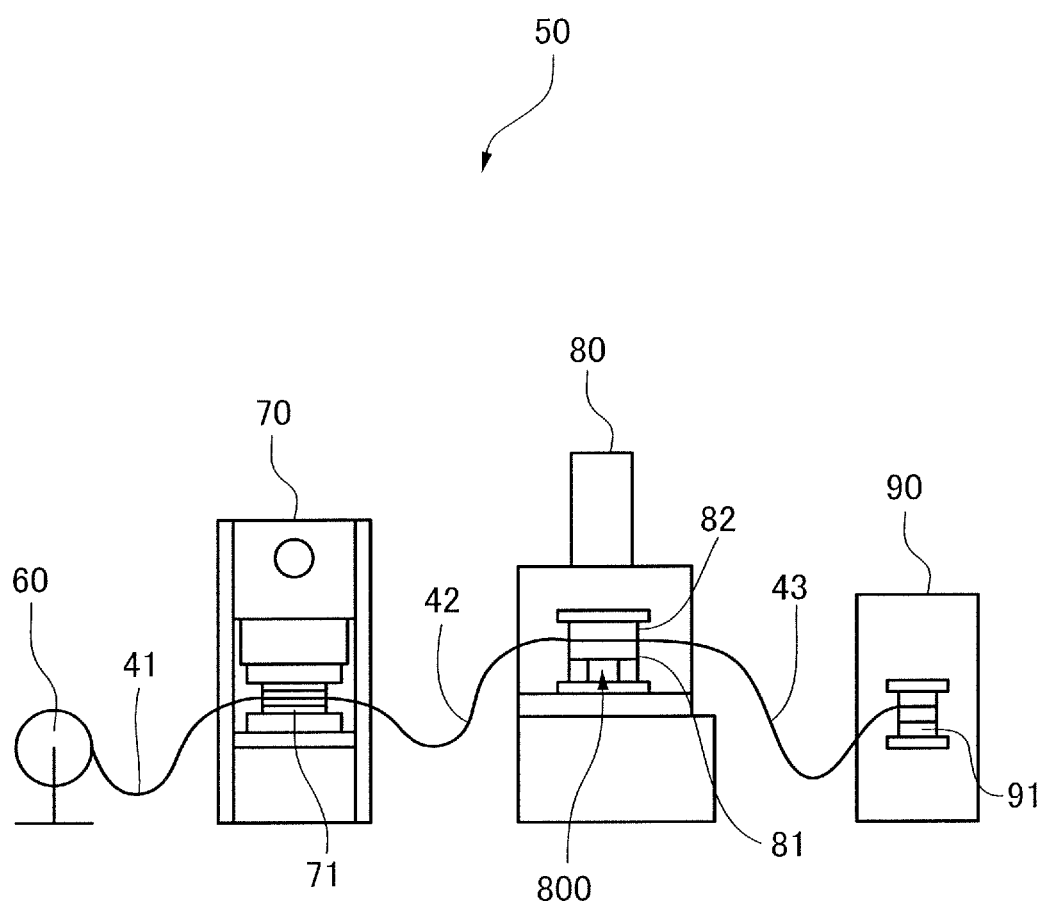
FIG. 4 illustrates a manufacturing system configured to manufacture the transmission member of the first embodiment.

FIG. 4 illustrates a manufacturing system 50 configured to manufacture the transmission member 100 of the first embodiment. The manufacturing system 50 illustrated in FIG. 4 is a system configured to mold a hoop and includes an uncoiler 60, a press machine 70, the injection molding machine 80, and a cutter 90.

The uncoiler 60 has a function of drawing a hoop member 41 which is a rolled metal plate. The hoop member to be pressed and drawn out by the uncoiler 60 is supplied to the press machine 70.

The press machine 70 includes a progressive press die 71, and the hoop member 41 to be pressed is supplied to the progressive press die 71 by a material feeder not illustrated. The hoop member 41 is pressed by the progressive press die 71, and a pressed hoop member 42 is drawn out sequentially by a drawing apparatus not illustrated. Then, the hoop member 42 is supplied to the injection molding machine 80.

Figure 5:
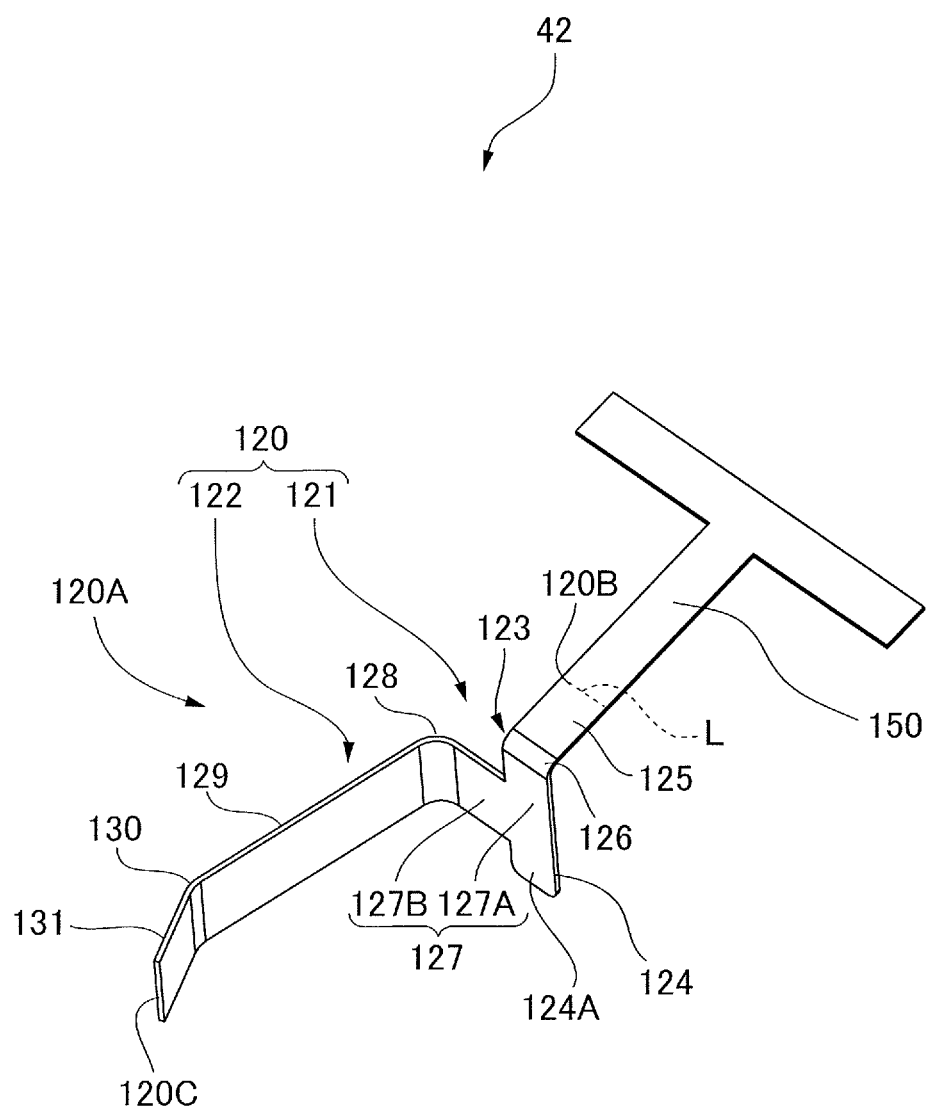
FIG. 5 is a perspective view illustrating a part of a hoop member after being pressed of the first embodiment.

FIG. 5 is a perspective view illustrating a part of the pressed hoop member 42 of the first embodiment. As illustrated in FIG. 5, the pressed hoop member 42 includes the metal member 120 which is an insert member and is a component of the transmission member 100 and a support portion 150 configured to support the metal member 120 in a cantilever condition. That is, the metal member 120 and the support portion 150 are integrated by the metal plate. It is noted that the metal member 120 and the support portion 150 are cut along a broken line L in FIG. 5 by the cutter 90 in FIG. 4 after a process of injection molding. It is also noted that the metal member 120 and the support portion 150 may be cut such that a part of the support portion 150 is left in the transmission member 100.

As illustrated in FIG. 4, the injection molding machine 80 includes a mold for insert molding 800 having a plurality of molds 81 and 82. The mold 81 serving as a first mold is a movable mold, and the mold 82 serving as a second mold, is a fixed mold. The injection molding machine 80 also includes a mold temperature adjusting machine not illustrated. The molds 81 and 82 include passages not illustrated such that fluid such as liquid supplied from the mold temperature adjusting machine not illustrated passes through the passages not illustrated to keep temperature of the molds 81 and 82 constant.

Figure 6:
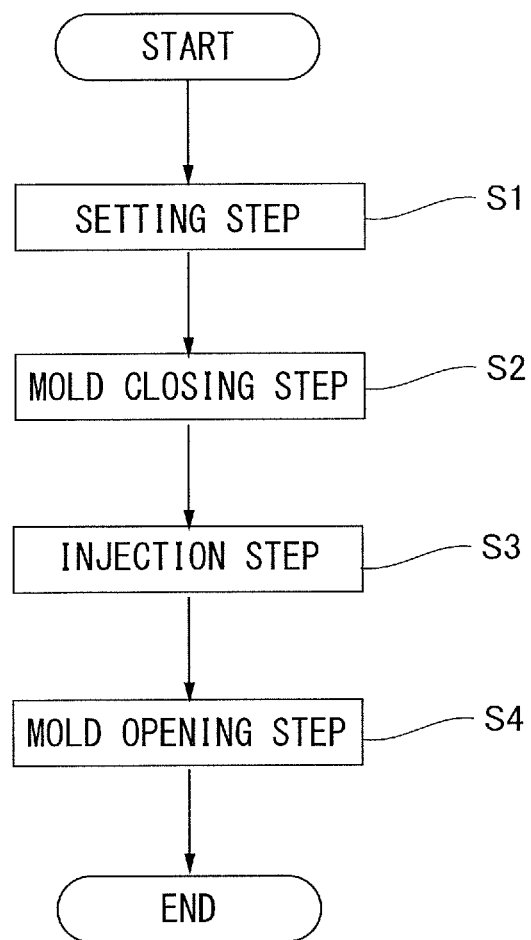
FIG. 6 is a flowchart illustrating a manufacturing process of the transmission member manufactured by insert molding of the first embodiment.

FIG. 6 is a flowchart illustrating a manufacturing process of the transmission member 100 by the insert molding of the first embodiment. Firstly, the hoop member 42 is conveyed between the opened molds 81 and 82, and the metal member 120 of the hoop member 42 is set in one of the opened molds 81 and 82, i.e., set in the mold 81 in the first embodiment, in a first step S1 serving as a setting step.

Figure 7A:
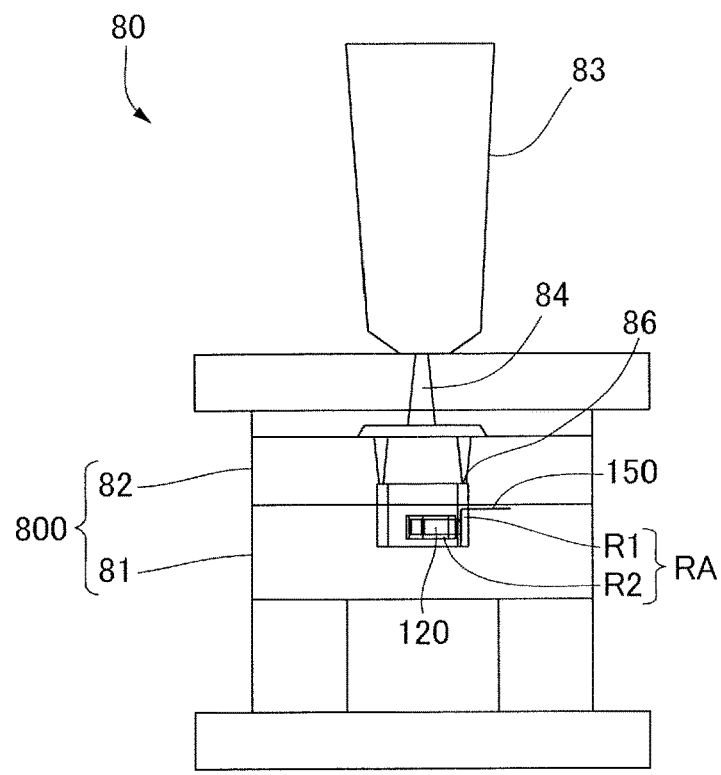
FIG. 7A is a schematic diagram of an injection molding machine in a condition in which molds of the first embodiment are closed.

FIG. 7A is a schematic diagram of the injection molding machine 80 in a condition in which the molds 81 and 82 are closed. As illustrated in FIG. 7A, the molds 81 and are closed so as to define a cavity RA in which the metal member 120 is disposed between the molds 81 and 82 in a second step S2 serving as a mold closing step. The cavity RA is a space defined between the molds 81 and 82 by closing the molds 81 and 82 and has a shape corresponding to the shape of the transmission member 100 to be molded. The cavity RA includes a space R1, serving as a first space, configured to mold the trunk portion 101 and a space R2, serving as a second space, configured to mold the arm portion 102. By closing the molds 81 and 82, the support portion 150 configured to support the metal member 120 in the cantilever condition is clamped and fixed by the molds 81 and 82. The metal member 120 is disposed across the space R1 and the space R2 in the condition in which the metal member 120 is cantilevered by the support portion 150 clamped and fixed by the molds 81 and 82.

Figure 7B:
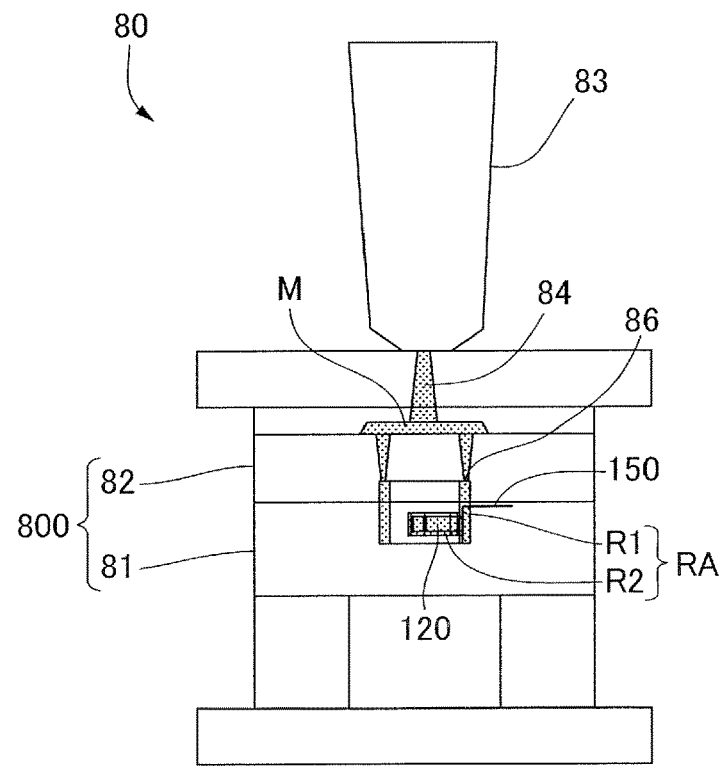
FIG. 7B is a schematic diagram of the injection molding machine in a condition in which a molten resin is injected into a cavity.

FIG. 7B is a schematic diagram of the injection molding machine 80 in a condition in which a molten resin M is injected into the cavity RA. As illustrated in FIG. 7B, the molten resin M is injected from a plasticizing cylinder 83 and is injected into the cavity RA through a sprue 84 and a gate 86 in a third step S3 serving as an injection step. The gate 86 is connected with the space R1 of the cavity RA, and the injected molten resin M flows also into the space R2 through the space R1. It is noted that positions and a number of the gates 86 may be determined by considering such that filling balance is taken to back and front surfaces of the metal member 120.

After cooling and solidifying the molten resin M within the cavity RA of the molds 81 and 82, the molds 81 and 82 are opened to take out the molded product by an ejector pin not illustrated in a fourth step S4 serving as a mold opening step. The insert molding of the transmission member 100 is thus carried out by the injection molding machine 80.

Finally, the molded hoop member 43 in a condition in which the metal member 120 molded by the resin member 140 is connected with the support portion 150 is discharged out of the injection molding machine 80 and is conveyed to the cutter 90 by a drawing apparatus not illustrated. The cutter 90 includes a cutting die 91, and the transmission member 100 is separated from the hoop member 43 by the cutting die 91. Thus, the transmission member 100 as the molded product, illustrated in FIG. 3 can be obtained.

Here, as illustrated in FIG. 5, the metal member 120 serving as the insert member includes an arm-like trunk portion 120A extending in an extension direction from the support portion 150. The trunk portion 120A is bent at a plurality of bent portions 126, 128 and 130 by pressing. A base end 120B in the extension direction of the trunk portion 120A is a fixed end connected with the support portion 150, and a distal end 120C in the extension direction of the trunk portion 120A is a free end. Then, the bent portions 126, 128 and 130 are disposed sequentially from the base end 120B to the distal end 120C of the trunk portion 120A. Because the plurality of bent portions 126, 128 and 130 are formed by bending, the metal member 120 including the bent portions 126, 128 and 130 causes process variations. In particular, the trunk portion 120A of the metal member 120 is supported by the support portion 150 in the cantilever condition in the first embodiment. Therefore, the positional variations of the distal end 120C in the extension direction of the trunk portion 120A of the metal member 120 tends to increase due to the process variations of the bent portion 126.

It is noted that the bent portion 126 closest to the support portion 150 and the bent portion 128 close to the support portion 150 next to the bent portion 126 are components of the trunk portion 101 as the metal portion 121, of the transmission member 100 as the molded product. The bent portion 130 is a component of the arm portion 102 extending from the trunk portion 101 as the metal portion 122. That is, each of the metal portion 121 and the metal portion 122 has at least one bent portion.

An arrangement is made in the first embodiment such that the metal member 120 having such process variations can be readily set in the mold 81 in the first step S1 described above. The metal member 120 and the mold 81 will be described below in detail.

At first, the metal member 120 will be described with reference to FIGS. 3 and 5. The metal member 120 includes a projecting portion 124 projecting from the trunk portion 120A. Here, the metal member 120 is composed of the metal portion 121 which is a component of the trunk portion 101 and the metal portion 122 which is a component of the arm portion 102 as described above. The metal portion 121 which becomes the component of the trunk portion 101 includes a base portion 123 which is a part of the trunk portion 120A. Accordingly, the metal portion 121 includes the projecting portion 124 connected to the base portion 123. That is, the projecting portion 124 becomes a component of the trunk portion 101. The projecting portion 124 is disposed so as to project out of the base portion 123.

The base portion 123 includes the bent portions 126 and 128, a connecting portion 125 and a flat plate portion 127. The connecting portion 125 is a flat metal plate disposed between the support portion 150 and the bent portion 126 and configured to connect the support portion 150 with the bent portion 126. The flat plate portion 127 is a flat metal plate extending from the bent portion 126 to an opposite side from the connecting portion 125 and is disposed between the bent portion 126 and the bent portion 128. The projecting portion 124 is a flat metal plate provided so as to project out of the flat plate portion 127 between the bent portion 126 and the bent portion 128. The projecting portion 124 projects out of an end of the flat plate portion 127 horizontally with the flat plate portion 127. A width of the projecting portion 124 is around 2 mm for example, and a projecting amount of the projecting portion 124 out of the flat plate portion 127 is around 2 mm for example.

The flat plate portion 127 is a flat metal plate formed into an L crank shape and includes an extending portion 127A serving as a first extending portion, extending from the bent portion 126 and an extending portion 127B serving as a second extending portion, extending in a direction crossing with the extending portion 127A. That is, the extending portion 127B is a metal plate extending horizontally with respect to the extending portion 127A. The projecting portion 124 is provided on an extension of the extending portion 127A in the first embodiment. It is noted that the metal portion 122 includes a straight portion 129, the bent portion 130 and a straight portion 131 disposed sequentially from a side of the bent portion 128 toward the distal end side of the metal member 120.

Figure 8A:
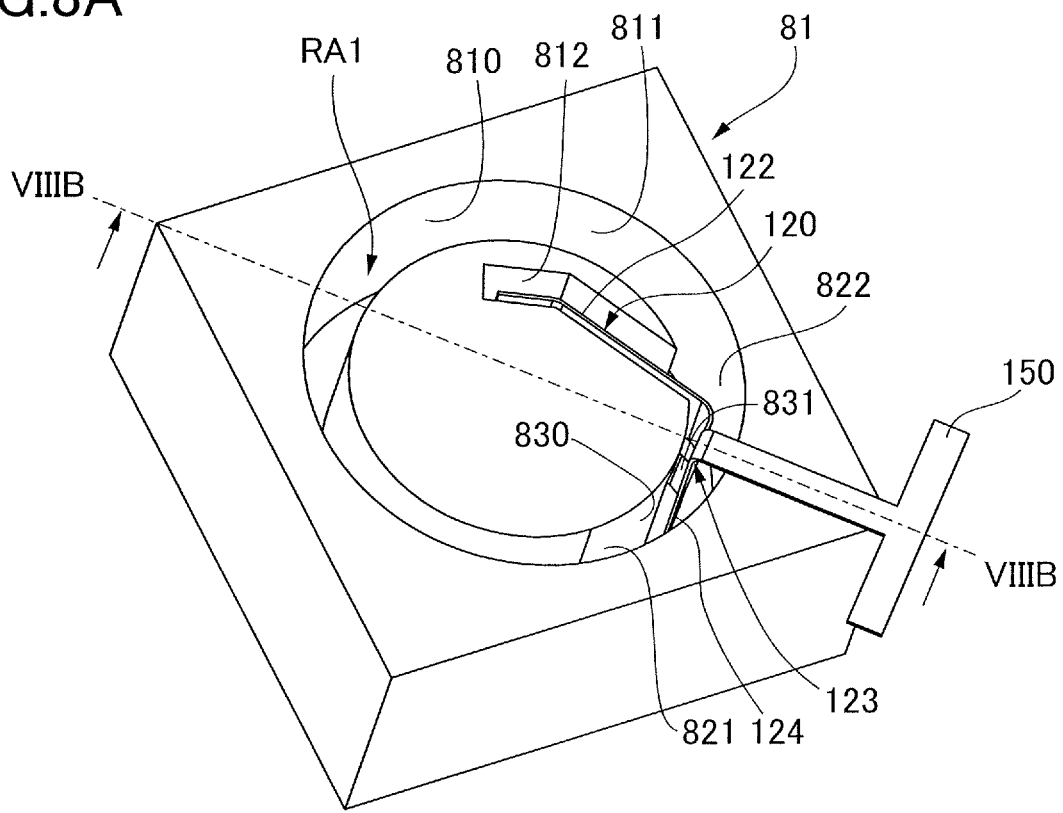
FIG. 8A is a perspective view illustrating a condition in which a metal member is set at the mold of the first embodiment.
Figure 8B:
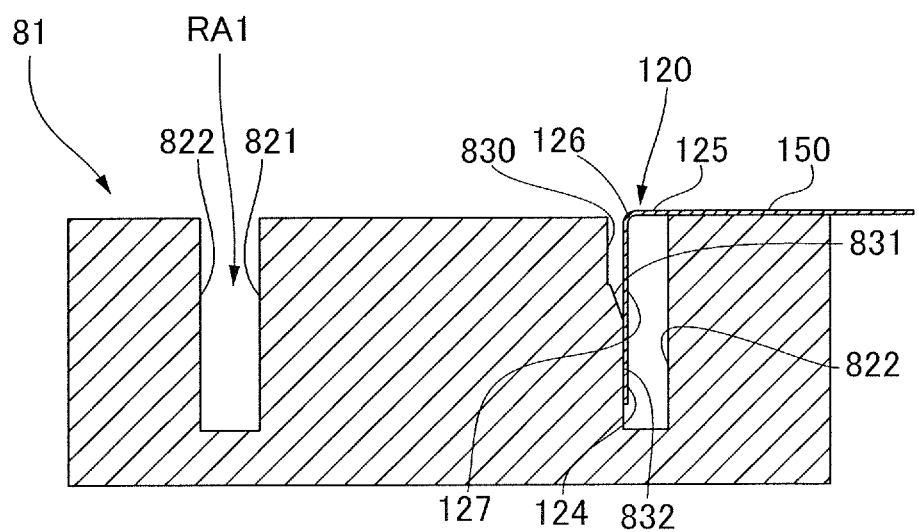
FIG. 8B is a section view of the mold and the metal member taken along a line VIIIB-VIIIB in FIG. 8A.

Next, the mold 81 will be described. FIG. 8A is a perspective view illustrating a condition in which a metal member 120 is set in the mold 81, and FIG. 8B is a section view of the mold 81 and the metal member 120 taken along a line VIIIB-VIIIB in FIG. 8A. The mold 81 includes the groove portion RA1 which is a part of the cavity RA to be formed together with the mold 82. In other words, the mold 81 includes a wall surface 810 defining the groove portion RA1. The groove portion RA1 is a space having a shape corresponding to a part of the trunk portion 101 and a part of the arm portion 102. It is noted that although not illustrated, the mold 82 also includes a groove portion, and a cavity RA is formed by the groove portion RA1 of the mold 81 and the groove portion not illustrated of the mold 82 when the molds 81 and 82 are closed.

The wall surface 810 includes a wall surface 811 which is a part corresponding to the trunk portion 101 and a wall surface 812 which is a part corresponding to the arm portion 102. The wall surface 811 includes a side wall surface 821 forming an inner circumferential surface 103 of the cylindrical trunk portion 101 and a side wall surface 822 forming an outer circumferential surface 104 of the trunk portion 101. The side wall surface 821 includes a main surface 830, a tapered surface 831 serving as a guide surface, and a straight surface 832 serving as an abutment surface adjacent to the tapered surface 831. The tapered surface 831 and the straight surface 832 project on a side of the side wall surface 822 with respect to the main surface 830. The tapered surface 831 is a surface inclined with respect to the main surface 830 and the straight surface 832. A width of the tapered surface 831 and the straight surface 832 is about the same with that of the projecting portion 124 and is around 2 mm for example.

An inclination angle of the tapered surface 831 may be set by taking durability of the mold and a positional shift amount caused by the process variations of the metal member 120 into consideration. Specifically, the inclination angle of the tapered surface 831 is preferable to be 30 degree or less and is more preferable to be around 20 degrees for example that enables to effectively guide the projecting portion 124.

Figure 9A:
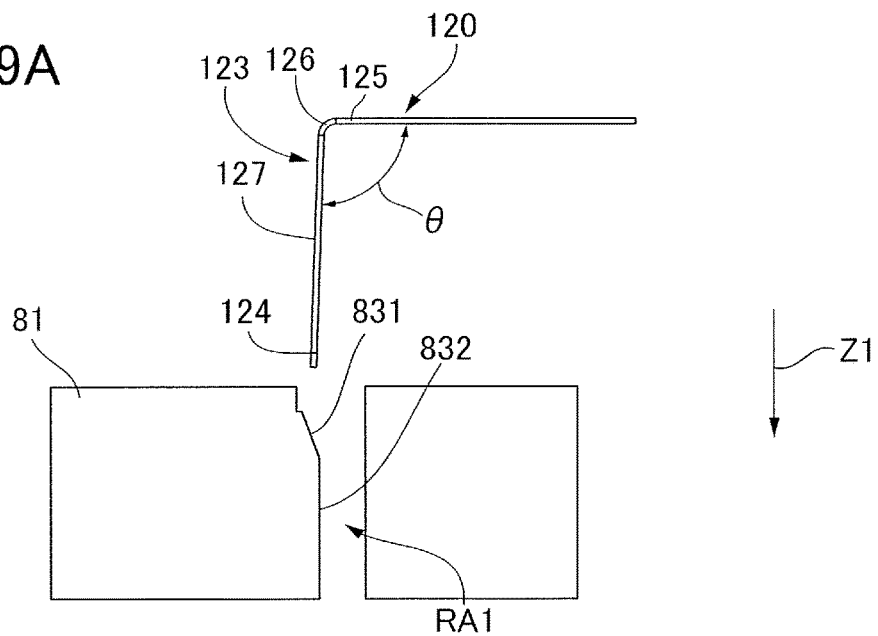
FIG. 9A is a schematic diagram illustrating a first step of the manufacturing method of a transmission member of the first embodiment in which the metal member is to be moved down to the mold.
Figure 9B:
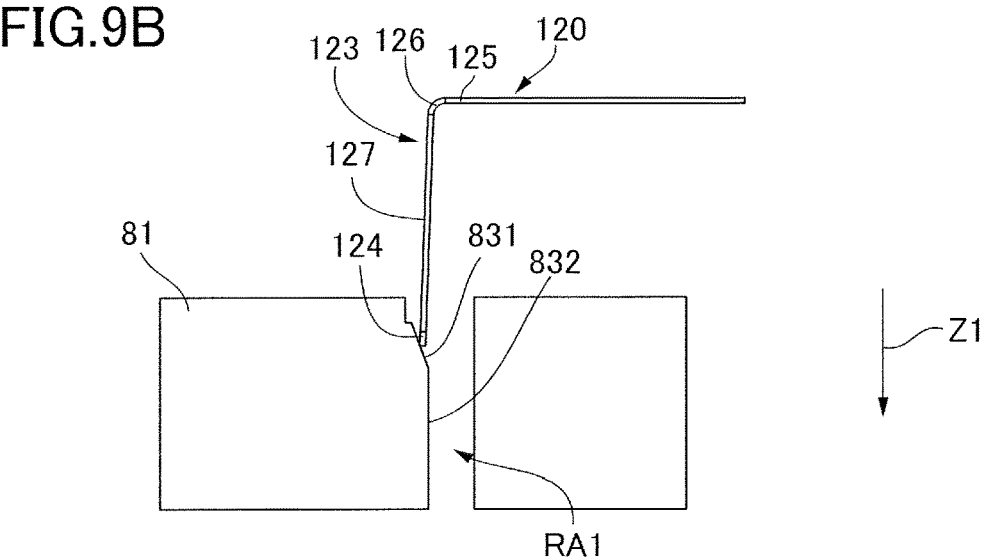
FIG. 9B is a schematic diagram illustrating a condition in which the metal member is moved down from the condition in FIG. 9A and a projecting portion of the metal member is in contact with a tapered surface of the mold.
Figure 9C:
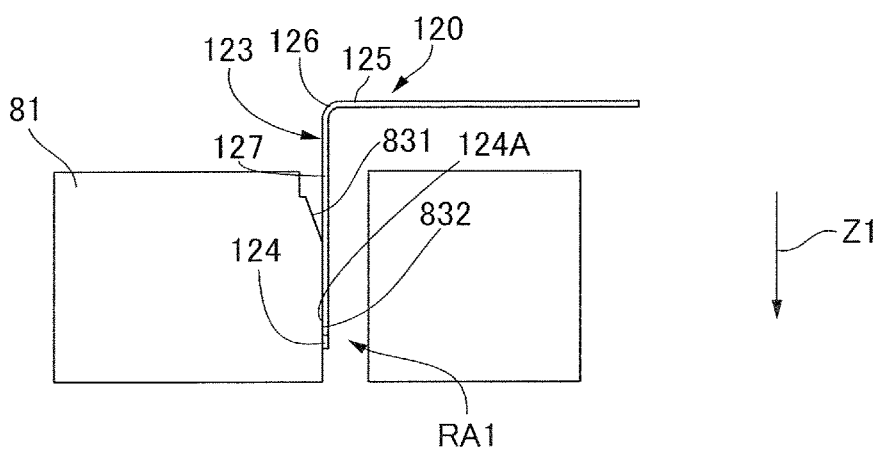
FIG. 9C is a schematic diagram illustrating a condition in which the metal member is moved down from the condition in FIG. 9B and the projecting portion of the metal member is in contact with a straight surface of the mold.

Next, the setting step serving as the first step S1, will be described in detail. FIGS. 9A through 9C are schematic diagrams illustrating the first step of the manufacturing method of the transmission member 100 of the first embodiment. The metal member 120 is moved down in a direction Z1 with respect to the mold 81 to set the metal member 120 in the groove portion RA1 of the mold 81. FIG. 9A illustrates a condition in which the metal member 120 is to be moved down to the mold 81. As illustrated in FIG. 9A, the projecting portion 124 is faced against the tapered surface 831 in the direction Z1. As the metal member 120 is moved down in the direction Z1 from the condition in FIG. 9A, the projecting portion 124 provided at a part close to the base end in the extension direction of the metal member 120 is inserted first into the groove portion RA1 as illustrated in FIG. 9B. Then, if the metal member 120 is successively moved down in the Z1 direction of the metal member 120, the distal end of the projecting portion 124 of the metal member 120 comes into contact with the tapered surface 831 of the mold 81.

A bending angle θ of the bent portion 126 of the metal member 120 before conveyed to the injection molding machine 80 in Step S1 is preferable to be 90 degrees or more and to be 93 degrees or less by taking an allowance into consideration. For instance, the bent portion 126 may be bent with a bending angle of 91.5 degree as a center value in the press machine 70 as illustrated in FIG. 4. Then, if the allowance of the process variations of bending in the press machine 70 is around ±1 degree for example, the bending angle θ of the bent portion 126 falls within the range of 90 degree or more to 93 degrees or less. It is noted that a bending angle of the bent portion 128 is around 75 degrees for example, and a bending angle of the bent portion 130 is around 34 degrees for example.

If the metal member 120 is moved down in the Z1 direction further from the condition in FIG. 9B, the projecting portion 124 is guided by the tapered surface 831 toward the straight surface 832. At this time, the base portion 123 of the metal member 120, or more specifically, the bent portion 126 deforms in the condition during which the projecting portion 124 is guided by the tapered surface 831. That is, the bent portion 126 is deformed such that the process variations at the bent portion 126 are cancelled. It is noted that at this time, the connecting portion 125 may be also distorted. The positional variations of the metal member 120, or the distal end 120C illustrated in FIG. 5 in particular, are reduced by the base portion 123 of the metal portion 121, or the bent portion 126 in particular, that are deformed so as to cancel the process variations, so that the metal member 120 is guided to a predetermined position within the groove portion RA1.

Then, if the metal member 120 is moved down further in the z1 direction, a surface 124A which is a part of the projecting portion 124 comes into slidable contact with the straight surface 832 as illustrated in FIG. 9C, and the setting of the metal member 120 in the groove portion RA1 is thus completed.

If the base portion 123 of the metal member 120, or more specifically the bent portion 126 or the connecting portion 125, is deformed, a spring force is generated and the projecting portion 124A of the projecting portion 124 comes into contact in a condition of being pressed against the straight surface 832 after setting the metal member 120 in the groove portion RA1. The projecting portion 124A is a surface disposed on a major angle side of the bent portion 126. This arrangement makes it possible to prevent the position of the metal member 120 from being shifted also after setting the metal member 120 in the groove portion RA1.

In this condition, the molds 81 and 82 are closed in Step S2. Next, the molten resin M is injected and filled into the cavity RA in Step S3. Then, molding is completed in the condition in which the metal member 120 is deformed due to solidification of the molten resin M, and the transmission member 100 as the molded product is obtained. While the metal member 120 is cantilevered in Step S3, the projecting portion 124 is in contact with the straight surface 832 by being urged by the spring force. Accordingly, even if a injecting pressure of the molten resin M injected into the cavity RA acts on the base portion 123, it is possible to prevent the position of the metal member 120 from shifting with respect to the groove portion RA1.

A part of a whole of the projecting portion 124A which is a part of the projecting portion 124 is exposed on the inner circumferential surface 103 of the trunk portion 101 in the transmission member 100 molded as described above and as illustrated in FIG. 3. This exposed part will be referred to as an exposed portion 151. Then, a tapered surface 152 having a shape corresponding to the tapered surface 831 and adjacent the exposed portion 151 is formed. Because the exposed portion 151 is a part where the straight surface 832 comes into contact with the projecting portion 124 and is not coated by the resin, the exposed portion 151 has a shape corresponding to the straight surface 832. Then, the arm portion 102 has a shape following the metal portion 122 of the metal member 120 and includes a straight portion 105, a bent portion 106 and a straight portion 107 sequentially from the base end side to the distal end side.

As described above, it is possible to prevent setting failure of the metal member 120, or of the metal portion 122, to the groove portion R1 in particular, because the projecting portion 124 is guided to the straight surface 832 along the tapered surface 831 in Step S1 in the first embodiment. Still further, it is possible to prevent the metal portion 122 from being set in the groove portion RA1 in a condition shifted in the groove portion RA1. Then, it is possible to readily set the metal member 120 in the groove portion RA1 by the tapered surface 831 of the mold 81 without providing another guide member outside of the mold 81. Accordingly, it is possible to obtain the transmission member 100 of the desirable shape by the simple configuration in which the tapered surface 831 and the straight surface 832 are provided in the mold 81. Thus, it is also possible to improve yield, i.e., productivity, of the production of the transmission member 100.

It is also possible to deform the base portion 123, or more specifically the bent portion 126, so as to cancel the process variations of the metal member 120 by guiding the projecting portion 124 to the groove portion RA1 in contact with the tapered surface 831. Because the metal member 120 is cantilevered by the support portion 150 in particular, it is readily possible to set the metal member 120 in the groove portion RA1 in the condition in which the metal portion 122 as the component of the arm portion 102 is positioned in the groove portion RA1.

Still further, the trunk portion 120A of the metal member 120 includes the plurality of bent portions 126, 128 and 130 in the first embodiment. Then, it is possible to position the metal portion 122 in the groove portion RA1 more effectively by setting the flat plate portion 127 between the bent portion 126 and the bent portion 128 in the groove portion RA1 while deforming the bent portion 126.

Still further, because the movable mold 81 has the shapes such as the tapered surface 831, the movable mold 81 may have more mold release resistance. Thereby, it is possible to prevent the molded product from biting the fixed mold 82 and thus to prevent mold release failure.

Second Embodiment

Figure 10:
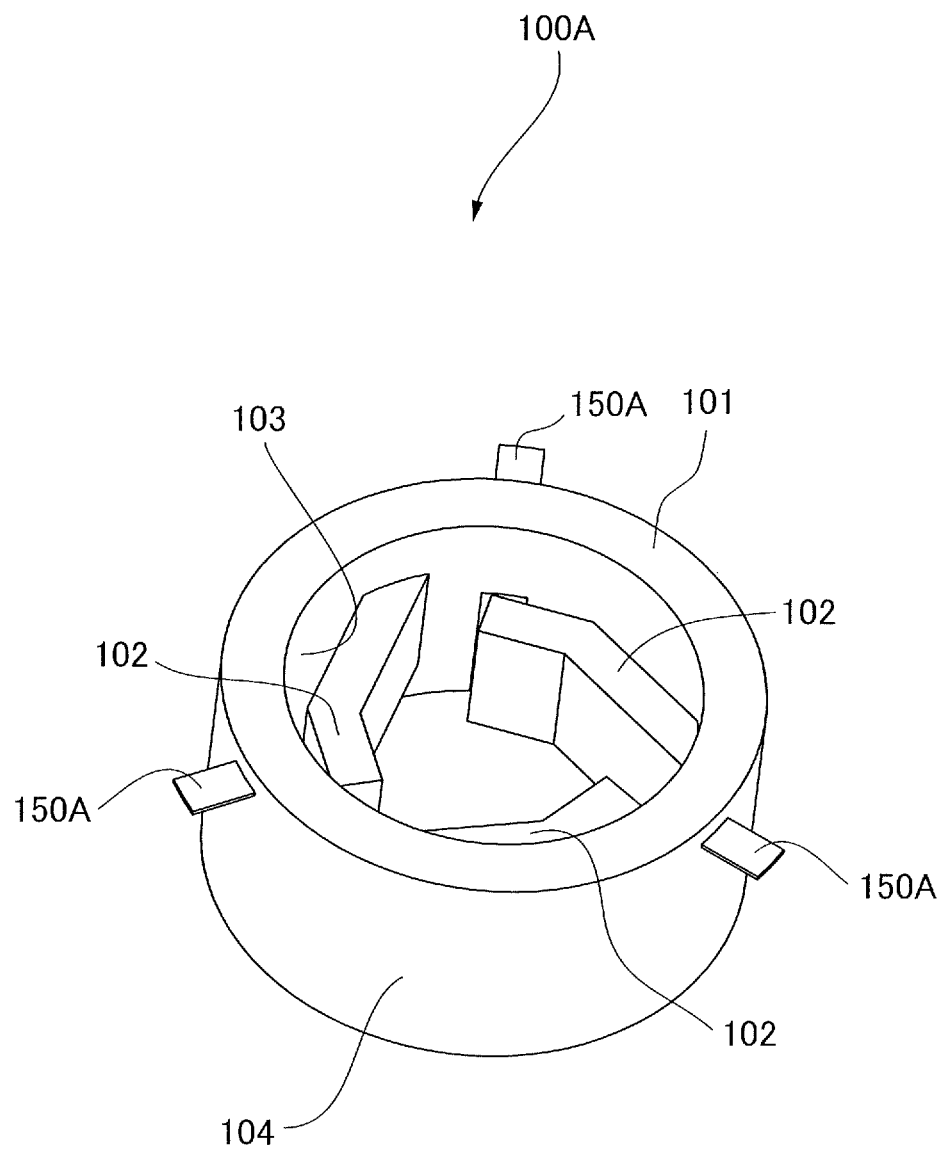
FIG. 10 is a perspective view of a transmission member which is one exemplary molded product of a second embodiment.

Next, a molded product and a manufacturing method of the molded product of a second embodiment will be described. FIG. 10 is a perspective view of a transmission member which is one exemplary molded product of the second embodiment. Similarly to the first embodiment, the transmission member 100A is manufactured by insert molding. Accordingly, only points different from the first embodiment will be described in the second embodiment. As illustrated in FIG. 10, the transmission member 100A includes a plurality, e.g., three in the second embodiment, of arm portions 102 that extend from the inner circumferential surface 103 of the trunk portion 101 similarly to the first embodiment. The transmission member 100A is disposed at the longitudinal end in the ±Z direction of the photosensitive drum 21 of the cartridge 20 as illustrated in FIG. 2 similarly to the first embodiment. It is noted that although a part of the support portion 150A is left in the transmission member 100A and projects out of the outer circumferential surface 104 of the trunk portion 101, the support portion 150A may be removed by cutting along the outer circumferential surface 104.

Figure 11A:
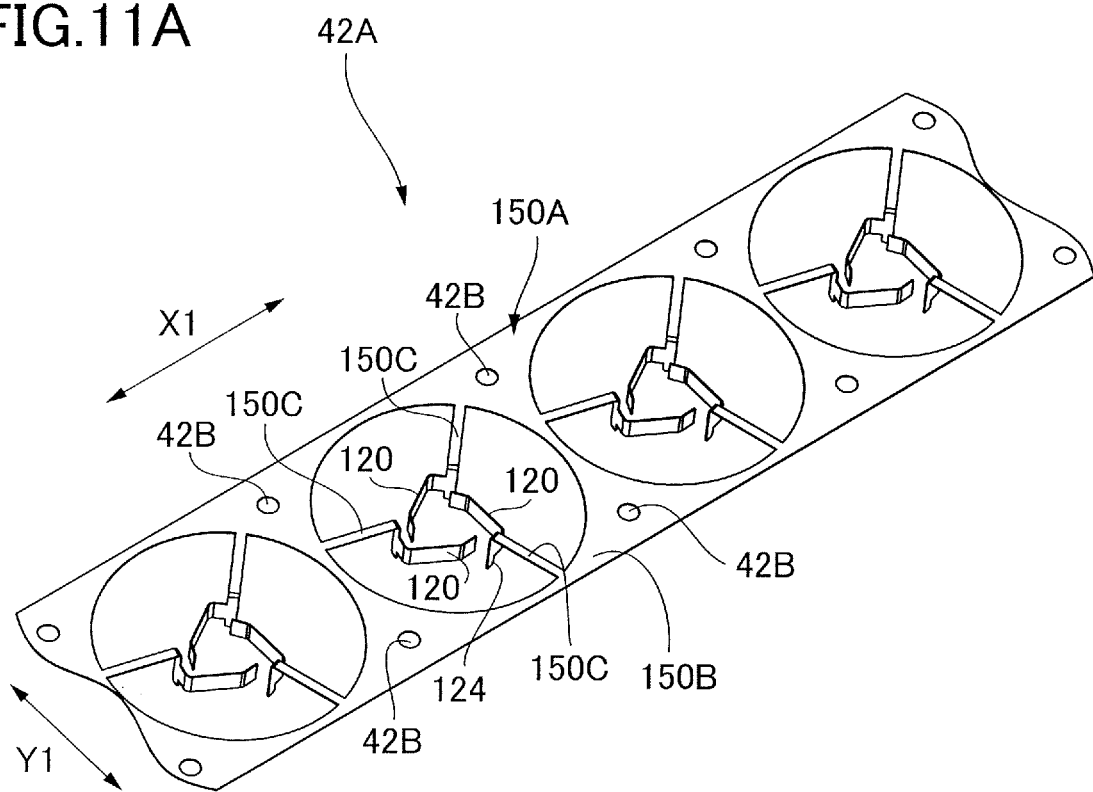
FIG. 11A is a perspective view illustrating a hoop member after being pressed of the second embodiment.

FIG. 11A is a perspective view illustrating the hoop member 42A after being pressed. The hoop member 42A includes three metal members 120 equidistantly disposed. The hoop member 42A includes a support portion 150B and supporting pieces 150C connected respectively with the three metal members 120. That is, the plurality of metal members 120 is cantilevered by a support portion 150A composed of the support portion 150B and the plurality of supporting pieces 150C.

Figure 11B:
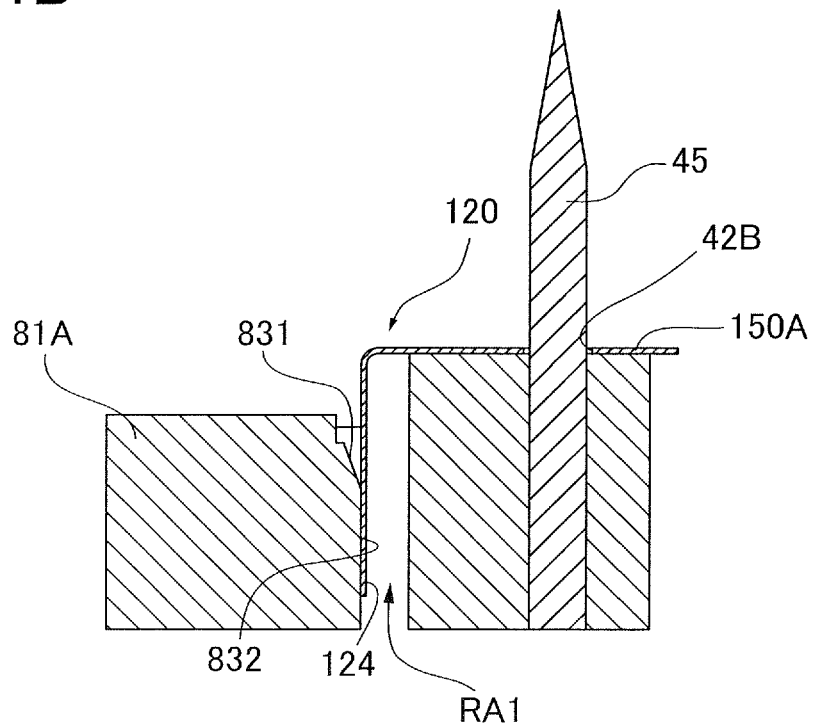
FIG. 11B is a schematic diagram illustrating a condition in which a metal member is set in a groove portion of a mold.

FIG. 11B is a schematic diagram illustrating a condition in which the metal member 120 is set in the groove portion RA1 of the mold 81A. Here, it is important to properly position the projecting portion 124 of the metal member 120 with the tapered surface 831 in setting the metal member 120 in the groove portion RA1. In particular, there is the plurality of metal members 120, and the mold 81A also includes a plurality of tapered surfaces 831 in the second embodiment. Accordingly, the projecting portion 124 of the respective metal members 120 has to be properly positioned to the respective tapered surfaces 831.

In the second embodiment, pilot holes 42B are perforated through the support portion 150B. The pilot holes 42B are perforated by two each in a short direction Y1 of the hoop member 42A and by a plurality of numbers equidistantly in a longitudinal direction X1 of the hoop member 42A. Each pilot hole 42B is a through hole of around 4 mm in diameter for example. It is noted that the pilot holes 42B are utilized not only for the injection molding machine 80 but also for positioning in the press machine 70 and the cutter 90 illustrated in FIG. 4.

The mold 81A is provided with a pilot pin 45 as illustrated in FIG. 11B. Positioning of the projecting portion 124 of each metal member 120 to each tapered surface 831 of the mold 81A is made by inserting the pilot pin 45 through the pilot hole 42B.

More specifically, the hoop member 42A is conveyed by a conveyor not illustrated above the mold 81A before Step S1 in FIG. 6. After completing the conveyance of the hoop member 42A, the hoop member 42A is moved down to the mold 81A in Step S1 in FIG. 6. Thereby, the pilot pin 45 is inserted through the pilot hole 42B and the hoop member 42A is positioned at a predetermined position by the pilot pin 45 before the projecting portion 124 of the metal member 120 comes into contact with the tapered surface 831. This arrangement makes it possible to bring the projecting portion 124 into contact with the tapered surface 831 more reliably in Step S1 in FIG. 6. Accordingly, it is possible to prevent setting failure from occurring in setting the metal member 120 in the groove portion RA1.

Figure 12:
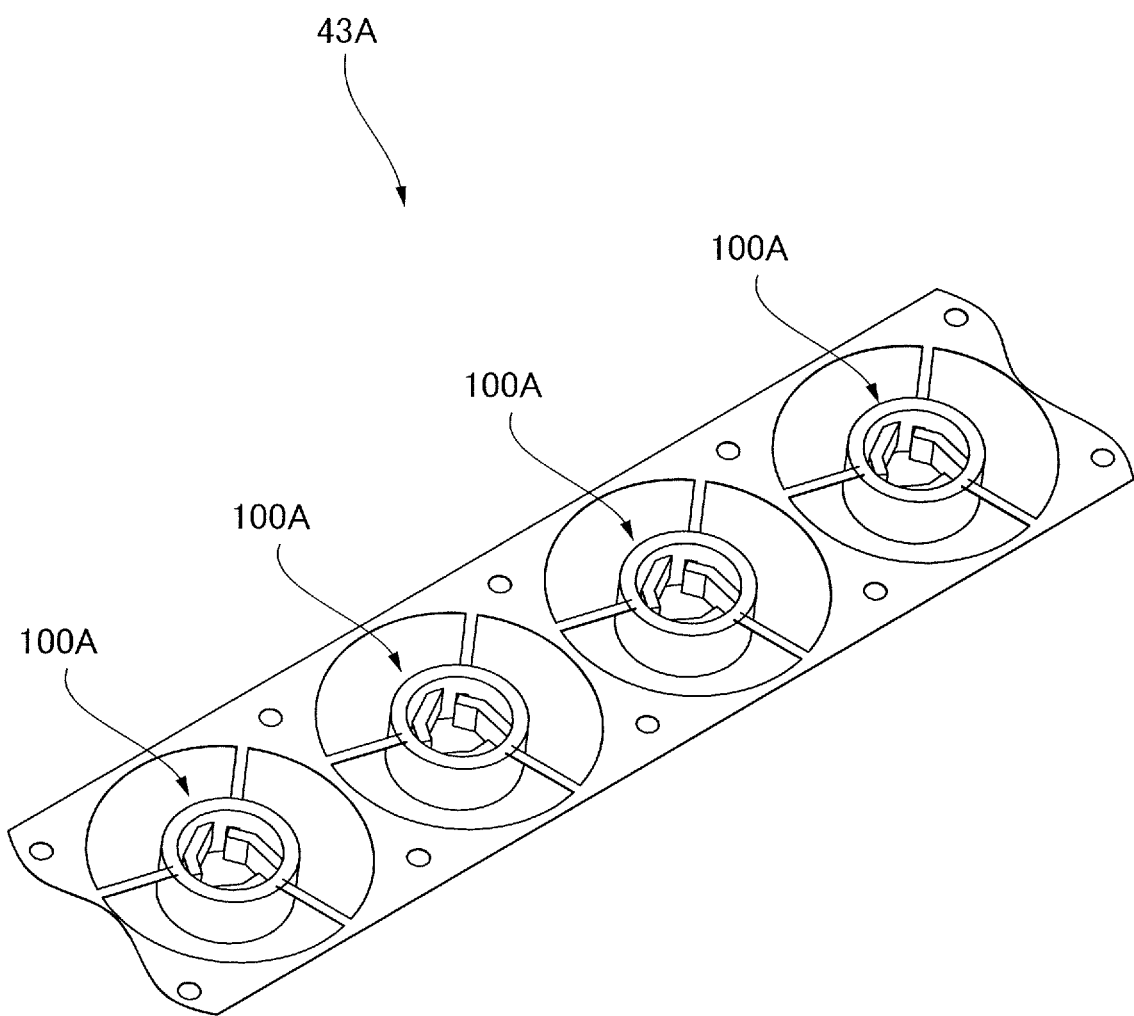
FIG. 12 is a perspective view illustrating the hoop member after being molded of the second embodiment.

After setting the metal member 120 to the groove portion RA1, the molds are closed and the molten resin is injected into the cavity. After solidifying the molten resin, the molded product is taken out. FIG. 12 is a perspective view illustrating the hoop member 43A after molding. The transmission member 100A, i.e., the molded product, illustrated in FIG. 10 can be obtained by cutting and separating the transmission member 100A from the hoop member 43A illustrated in FIG. 12 by the cutter 90 in FIG. 4.

Third Embodiment

Figure 13A:
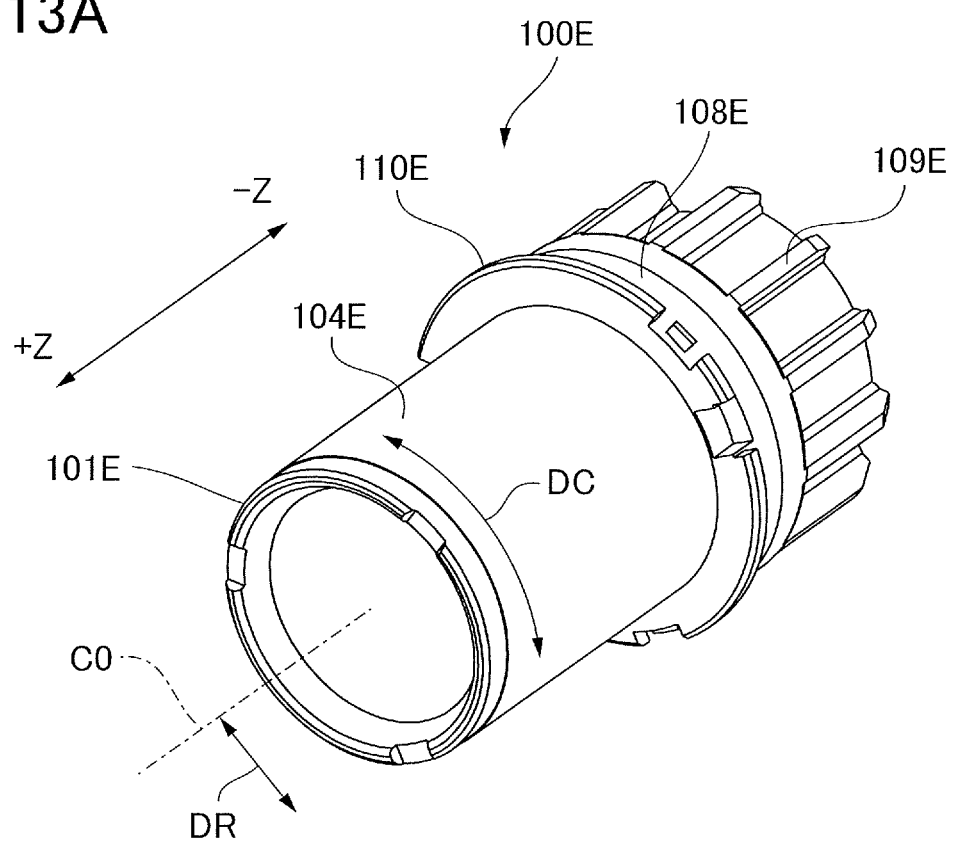
FIG. 13A is a perspective view illustrating a transmission member which is one exemplary molded product of a third embodiment.
Figure 13B:
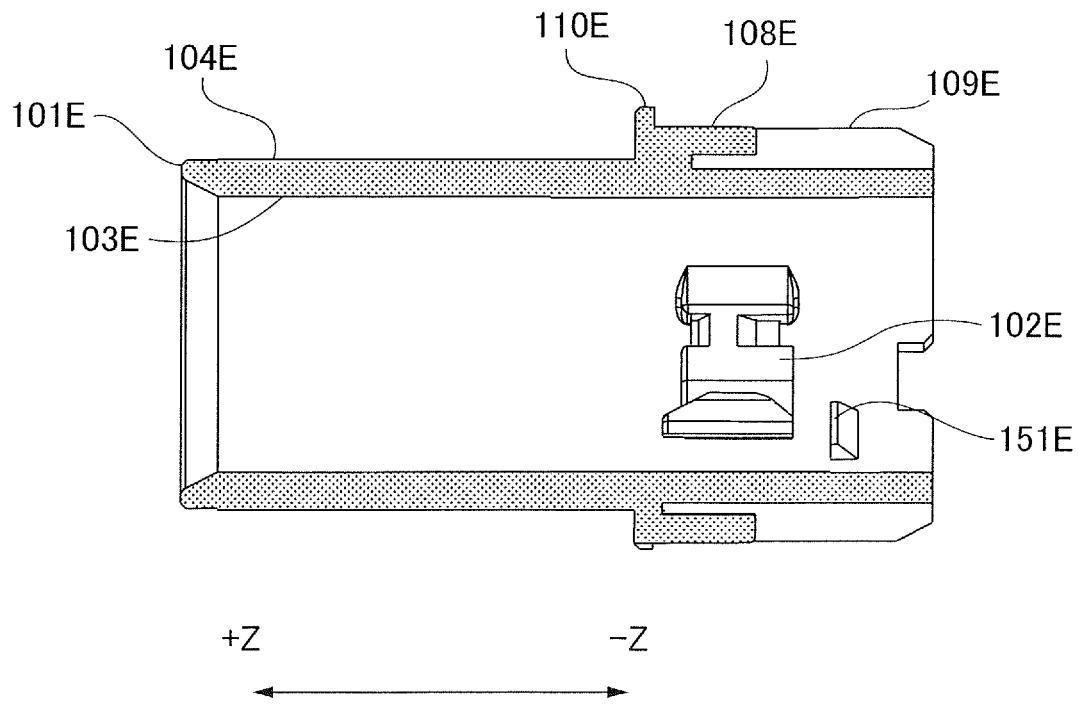
FIG. 13B is a section view illustrating the transmission member illustrated in FIG. 13A.
Figure 14:
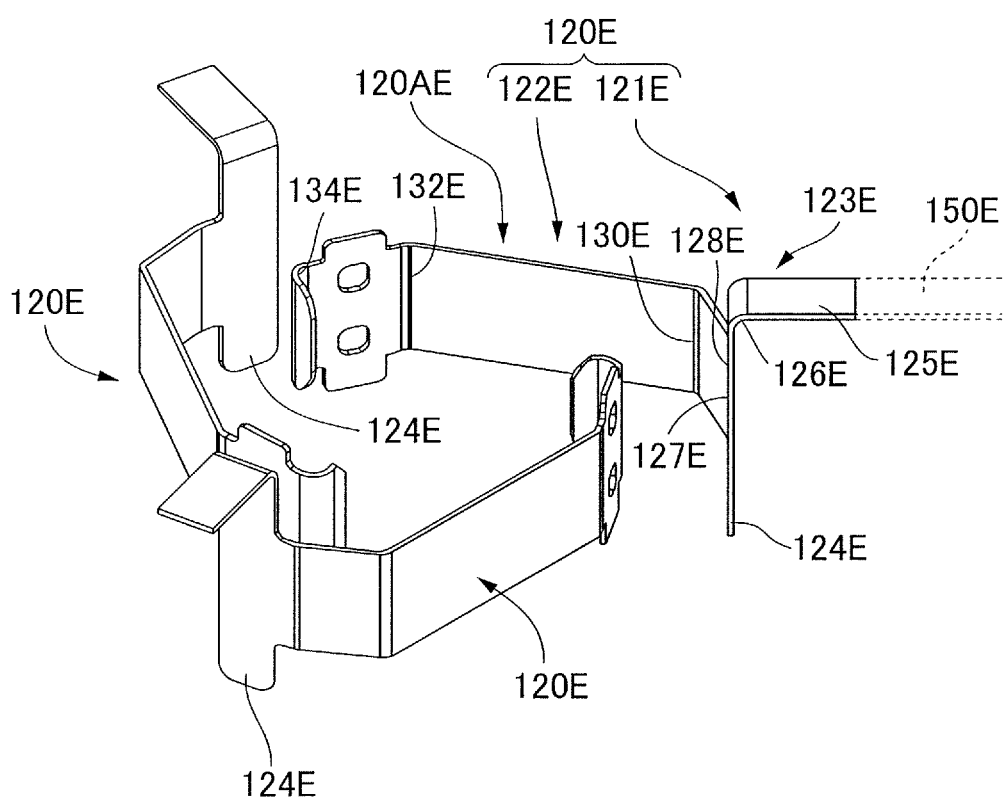
FIG. 14 is a perspective view of a metal member in the transmission member of the third embodiment.
Figure 15A:
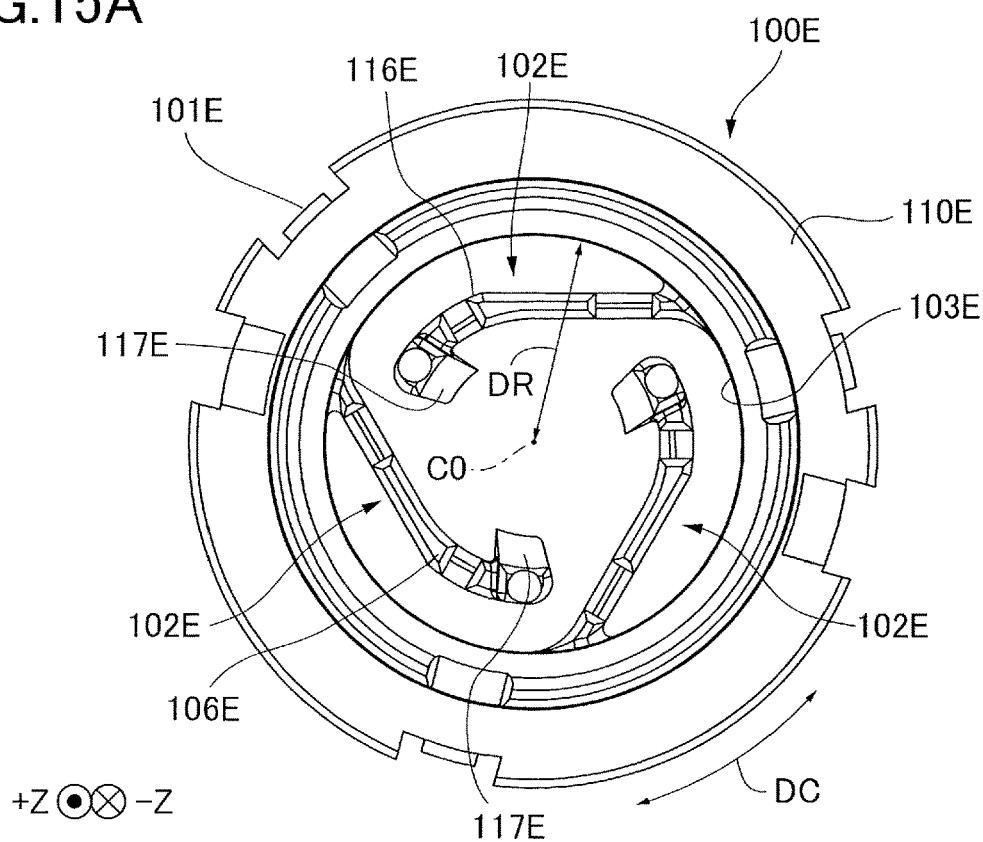
FIG. 15A is a plan view of the transmission member of the third embodiment.
Figure 15B:
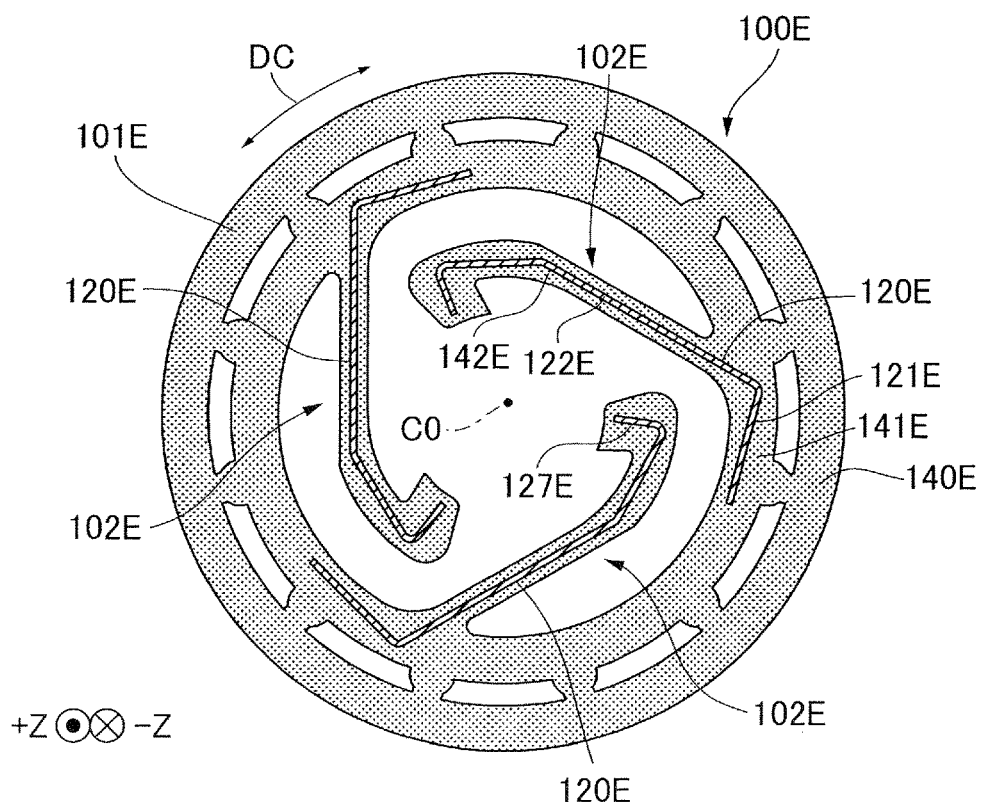
FIG. 15B is a section view illustrating the transmission member illustrated in FIG. 15A.

Next, the transmission member which is one exemplary molded product of a third embodiment will be described. FIG. 13A is a perspective view illustrating a transmission member 100E which is one exemplary molded product of the third embodiment. FIG. 13B is a section view of the transmission member 100E taken along an axial line C0 orthogonal to a radial direction DR of the transmission member 100E illustrated in FIG. 13A. FIG. 14 is a perspective view illustrating metal members in the transmission member of the third embodiment. It is noted that the resin member is not illustrated in FIG. 14. FIG. 15A is a plan view illustrating the transmission member 100E seen in the −Z direction. FIG. 15B is a section view illustrating the transmission member 100E taken along the radial direction DR of the transmission member 100E illustrated in FIG. 15A. Similarly to the first and second embodiments, the transmission member 100E is disposed at the end in the longitudinal direction, i.e., the ±Z direction, of the photosensitive drum 21 of the cartridge illustrated in FIG. 2. Similarly to the first and second embodiments, the transmission member 100E is manufactured by insert molding. It is noted that because the manufacturing method of the molded product using the molds is same with those of the first and second embodiments, the manufacturing method and the molds will not be described here.

As illustrated in FIGS. 13A and 13B, the transmission member 100E includes a cylindrical trunk portion 101E. It is noted that the axial line C0 indicated in FIG. 13A is an imaginary line passing through a center of the cylindrical trunk portion 101E. Still further, as illustrated in FIGS. 15A and 15B, the transmission member 100E includes a plurality of arm portions 102E extending from an inner circumferential surface 103E of the trunk portion 101E. The transmission member 100E includes three arm portions 102E in the third embodiment. The three arm portions 102E are disposed equidistantly at intervals of 120 degrees in a circumferential direction DC.

As illustrated in FIGS. 13A and 13B, an outer circumferential surface 104E of the trunk portion 101E is provided with a press-fit portion 108E press-fitted into an inner circumferential surface of the photosensitive drum 21 and a guide portion 109E configured to guide the inner circumferential surface of the photosensitive drum 21 to the press-fit portion 108E. The guide portion 109E is disposed on the −Z direction side with respect to the press-fit portion 108E.

The press-fit portion 108E fixes a coupling member not illustrated to the photosensitive drum 21 by being press-fitted into an inside of the photosensitive drum 21. Specifically, the inner circumferential surface of the photosensitive drum 21 and the outer circumferential surface of the press-fit portion 108E are formed so as to have a tight fit relationship with each other. It is noted that no tight fit relationship is required in a configuration in which fastening force is enhanced by caulking or in which the inner circumferential surface of the photosensitive drum 21 is fixed with the outer circumferential surface of the press-fit portion 108E by adhesive.

The outer circumferential surface 104E of the trunk portion 101E is also provided with a flange portion 110E that serves as a stopper when the press-fit portion 108E is press-fitted into the photosensitive drum 21. The flange portion 110E is disposed on the side of the +Z direction with respect to the press-fit portion 108E.

As illustrated in FIG. 15A, each arm portion 102E includes an arm body 116E extending from the inner circumferential surface 103E of the trunk portion 101E and a hook 117E provided at a distal end of the arm body 116E. The hook 117E is movable in the radial direction DR because the arm body 116E elastically deforms in the radial direction DR.

In the third embodiment, the metal member 120E is disposed across the trunk portion 101E and the arm portion 102E. The metal member 120E is integrally formed with the resin member 140E. As illustrated in FIG. 14, the metal member 120E includes an armed trunk portion 120AE. The trunk portion 120AE is bent by pressing at a plurality of bent portions 126E, 128E, 130E, 132E and 134E. Here, the metal member 120E is composed of a metal portion 121E which is a component of the trunk portion 101E and is a first metal portion and a metal portion 122E which is a component of the arm portion 102E and is a second metal portion extending from the metal portion 121E. As illustrated in FIG. 15B, a resin member 140E is composed of a resin portion 141E which is a component of the trunk portion 101E and is a first resin portion integrated with the metal portion 121E and a resin portion 142E which is a component of the arm portion 102E and a second resin portion integrated with the metal portion 122E.

As illustrated in FIG. 14, the metal member 120E serving as the insert member includes a projecting portion 124E projecting from the trunk portion 120AE. The metal portion 121E which is a component of the trunk portion 101E includes a base portion 123E which is a part of the trunk portion 120AE. Accordingly, the metal portion 121E includes the projecting portion 124E connected with the base portion 123E. That is, the projecting portion 124E is a component of the trunk portion 101E. The projecting portion 124E is disposed so as to project out of the base portion 123E.

The base portion 123E includes the bent portions 126E, 128E and 130E, the connecting portion 125E, and a flat plate portion 127E. The connecting portion 125E is a flat metal plate disposed between the support portion 150E and the bent portion 126E and configured to connect the support portion 150E with the bent portion 126E. The flat plate portion 127 is a flat metal plate extending from the bent portion 126E to a side opposite from the connecting portion 125E and is disposed between the bent portion 126E and the bent portion 128E. The projecting portion 124E is a flat metal plate provided so as to project out of the flat plate portion 127E between the bent portion 126E and the bent portion 128E. The projecting portion 124E projects out of an end of the flat plate portion 127E horizontally to the flat plate portion 127E. As illustrated in FIG. 13B, a part or of a whole of a part of a surface which is a part of the projecting portion 124E is exposed on the inner circumferential surface 103E of the trunk portion 101E. This exposed portion will be referred to as an exposed portion 151E. The exposed portion 151E has a shape corresponding to the straight surface of the mold because this part is where the straight surface of the mold has been in contact with the projecting portion 124E and has not been coated by the resin.

Figure 16A:
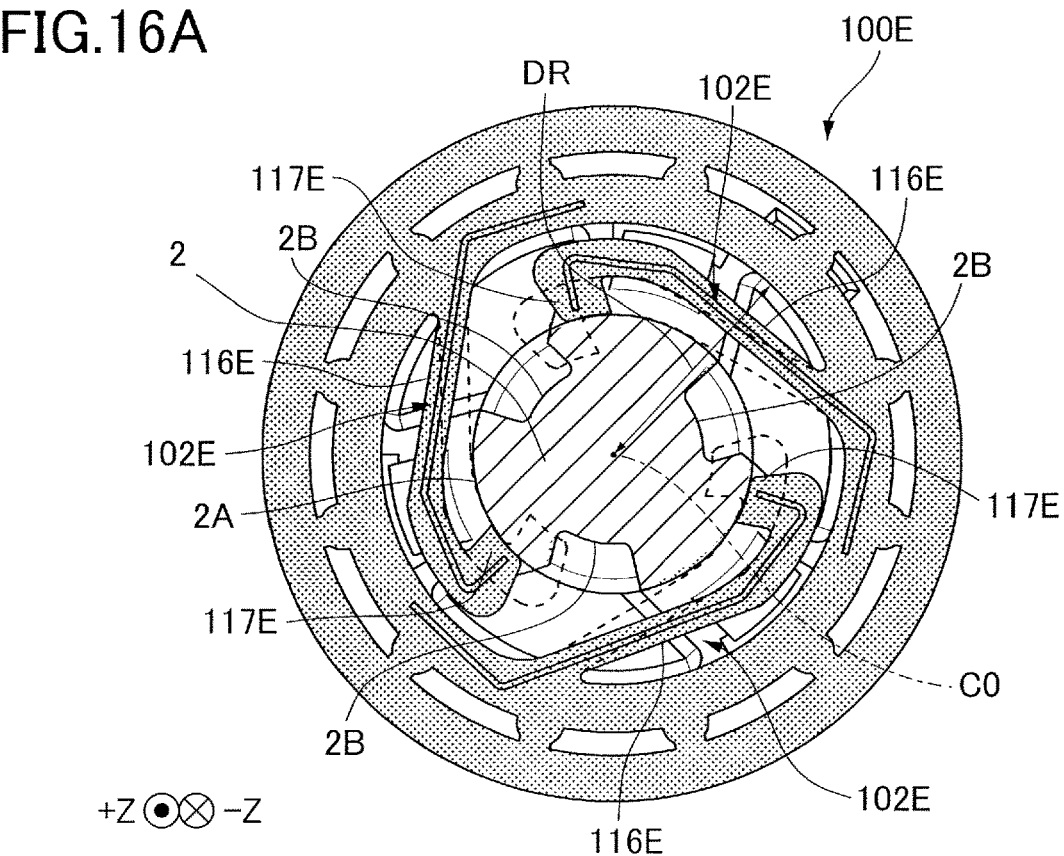
FIG. 16A is a section view illustrating a condition in which the transmission member of the third embodiment is attached to a driving shaft and in which a hook of the transmission member is to be engaged with a groove portion of the driving shaft.
Figure 16B:
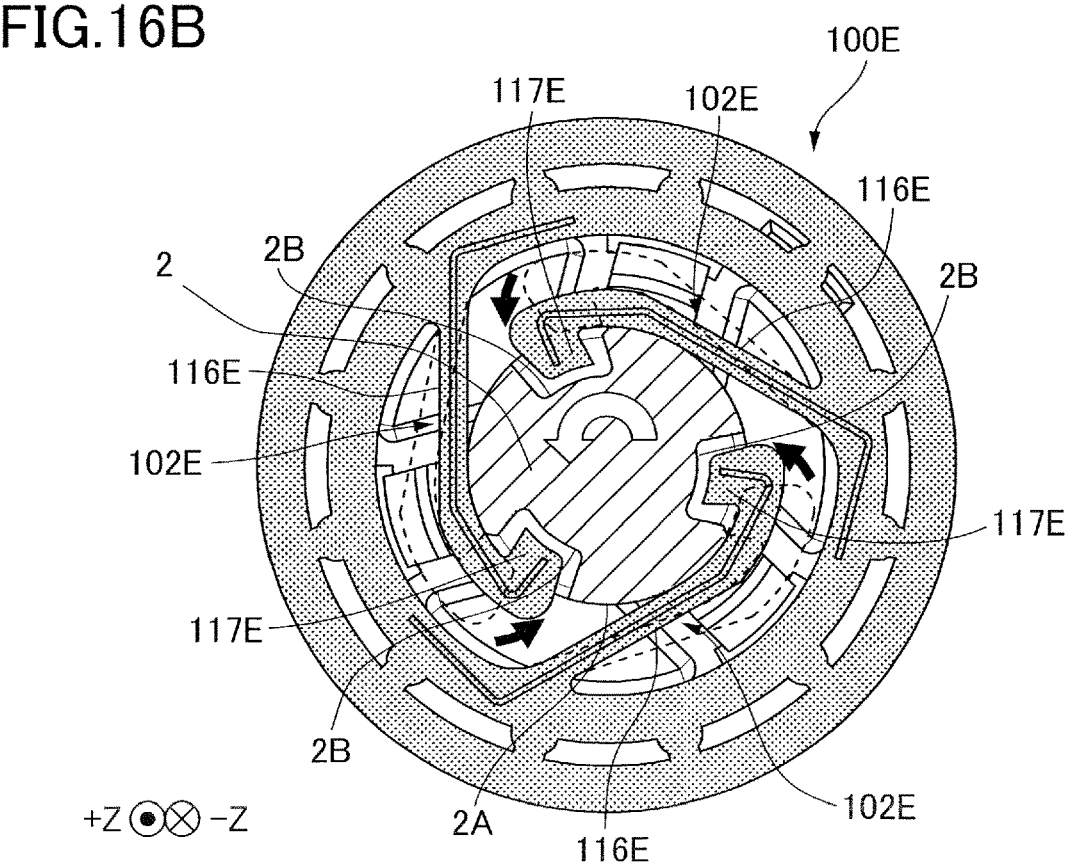
FIG. 16B is a section view illustrating a condition in which the hook of the transmission member is engaged with the groove portion of the driving shaft.

FIGS. 16A and 16B illustrate conditions in which the transmission member 100E is attached to the driving shaft 2. The three groove portions 2B disposed corresponding to the hooks 117E are provided on an outer circumferential surface 2A of the driving shaft 2. Each groove portion 2B extends in the ±Z direction. The hook 117E of each arm portion 102E is formed into a shape that fits into the groove portion 2B of the driving shaft 2 and is configured so as to receive rotational force from the driving shaft 2 by engaging and fitting with the groove portion 2B.

In a case where the user mounts the cartridge 20 illustrated in FIG. 2 to the image forming apparatus body 1, the user disposes the cartridge 20 such that the driving shaft 2 is coaxial with the transmission member 100E illustrated in FIG. 16A and moves the cartridge 20 in the ±Z direction. Thereby, the arm body 116E of each arm portion 102E is elastically deformed to outside of the radial direction DR, and the hook 117E abuts with the outer circumferential surface 2A of the driving shaft 2 as illustrated in FIG. 16A. When the driving shaft 2 is rotated in this condition, the arm body 116E which has been elastically deformed is restored to inside of the radial direction DR and the hook 117E fits into the groove portion 2B as illustrated in FIG. 16B when the groove portion 2B faces the hook 117E. It is noted in a case where the user removes the cartridge 20 out of the image forming apparatus body 1, the user moves the cartridge 20 in the −Z direction such that the transmission member 100E moves in the −Z direction. Thereby, the arm body 116E of each arm portion 102E is elastically deformed to outside of the radial direction DR and the hook 117E is disengaged from the groove portion 2B.

As described above, according to the transmission member 100E of the third embodiment, the rigidity and the creep strength of each arm portion 102E of the transmission member 100E can be enhanced because the resin member 140E is integrally molded with the metal member 120E.

It is noted that the present disclosure is not limited to the embodiments described above and may be modified variously within the technical concept of the present disclosure. Still further, the advantageous effects described in the embodiments are what the most preferable effects are merely enumerated, and the advantageous effects of the present disclosure are not limited to those described in the embodiments.

For instance, although the case where the trunk portion is cylindrical has been described in the embodiments described above, the shape of the trunk portion is not limited to be cylindrical. For instance, the trunk portion may be a flat.

Still further, while the case where the metal member is set in the groove portion of the movable mold in Step S1 of the embodiments described above, the present disclosure is not limited to such a case. The present disclosure is applicable also to a case where the metal member is set on a groove portion not illustrated of the fixed mold.

Still further, although the case where the number of the molds is two has been described in the embodiments described above, the present disclosure is not limited to such a case and is applicable also to a case where the cavity is formed by three or more molds.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-055124, filed Mar. 21, 2017, which is hereby incorporated by reference wherein in its entirety.

What is claimed is:

1. A manufacturing method of a molded product, comprising:
    preparing a mold with a groove portion forming a part of a cavity, and an insert member comprising a base portion, and a projecting portion projecting from the base portion, wherein the mold comprises a tapered surface connected with the groove portion;
    setting the insert member at the groove portion of the mold while guiding the projecting portion by the tapered surface; and
    injecting a molten resin into the cavity in a state in which the insert member is set.

2. The manufacturing method of the molded product according to claim 1, wherein the groove portion includes an abutment surface disposed adjacent the tapered surface, and
    wherein the molten resin is injected into the cavity in a condition in which the projecting portion is in contact with the abutment surface.

3. The manufacturing method of the molded product according to claim 1, wherein the molten resin is injected into the cavity in a condition in which the insert member is cantilevered by a support portion.

4. The manufacturing method of the molded product according to claim 3, wherein the base portion includes a bent portion, a connecting portion configured to connect the bent portion with the support portion, and a flat plate portion extending from the bent portion to an opposite side from the connecting portion, and wherein the projecting portion is provided on the flat plate portion.

5. The manufacturing method of the molded product according to claim 4, wherein the flat plate portion includes a first extending portion extending from the bent portion and a second extending portion extending in a direction crossing with the first extending portion, and wherein the projecting portion is provided on an extension of the first extending portion.

6. The manufacturing method of the molded product according to claim 4, wherein a bending angle of the bent portion is 90 degrees to 93 degrees in a condition before the setting of the insert member in the groove portion.

* * * * *